(12) United States Patent
Jangid et al.

(10) Patent No.: US 11,483,760 B2
(45) Date of Patent: Oct. 25, 2022

(54) METHODS AND SYSTEMS FOR PERFORMING PAGING OPERATIONS IN A 5G NETWORK

(71) Applicant: Samsung Electronics Co., Ltd., Suwon-si (KR)

(72) Inventors: Alok Kumar Jangid, Bangalore (IN); Kailash Kumar Jha, Bangalore (IN); Govind Irappa Uttur, Bangalore (IN); Danish Ehsan Hashmi, Bangalore (IN); Lalith Kumar, Bangalore (IN); Nitesh Pushpak Shah, Bangalore (IN); Young-kyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/611,192

(22) PCT Filed: May 4, 2018

(86) PCT No.: PCT/KR2018/005203
§ 371 (c)(1),
(2) Date: Nov. 5, 2019

(87) PCT Pub. No.: WO2018/203713
PCT Pub. Date: Nov. 8, 2018

(65) Prior Publication Data
US 2020/0145910 A1    May 7, 2020

(30) Foreign Application Priority Data

May 5, 2017 (IN) .............................. 201741015976
Jun. 19, 2017 (IN) .............................. 201741021399
Apr. 30, 2018 (IN) .............................. 201741015976

(51) Int. Cl.
*H04W 48/16* (2009.01)
*H04W 76/25* (2018.01)
(Continued)

(52) U.S. Cl.
CPC ............. *H04W 48/16* (2013.01); *H04W 8/08* (2013.01); *H04W 60/00* (2013.01);
(Continued)

(58) Field of Classification Search
CPC ... H04W 76/27; H04W 80/02; H04W 68/005; H04W 76/19; H04W 76/15; H04W 76/18;
(Continued)

(56) References Cited

U.S. PATENT DOCUMENTS

2008/0259912 A1    10/2008 Wang et al.
2011/0296494 A1    12/2011 Muller et al.
(Continued)

FOREIGN PATENT DOCUMENTS

CN    101325583 A    12/2008
CN    102017719 A    4/2011
(Continued)

OTHER PUBLICATIONS

3GPP TS 24.301 V14.3.0, dated Mar. 2017 (p. 54-64 and 239-240) (Year: 2017).*
(Continued)

*Primary Examiner* — Daniel Lai

(57) ABSTRACT

Embodiments herein provide methods and systems for performing paging operation in 5G communication networks. The 5G core network can transmit a NAS message to a UE through a N3GPP access network, if the UE is reachable through the N3GPP access network. The NAS message can be sent by the 5G core network to the N3IWF. The N3IWF can send the NAS message to the UE, through the N3GPP access network. The UE can send a service request over (Continued)

3GPP access, in response to the NAS message, to the 5G core network, through a 5G RAN. If the UE is not having access to the 5G RAN, then the UE can transmit a notification response message to the 5G core network, indicating the inability to transmit a service request. The transmission of NAS message through the N3IWF can lead to a significant saving of radio resources.

14 Claims, 8 Drawing Sheets

(51) Int. Cl.
  *H04W 8/08* (2009.01)
  *H04W 60/00* (2009.01)
  *H04W 68/00* (2009.01)
  *H04W 80/10* (2009.01)

(52) U.S. Cl.
  CPC ......... *H04W 68/005* (2013.01); *H04W 76/25* (2018.02); *H04W 80/10* (2013.01)

(58) Field of Classification Search
  CPC ... H04W 36/14; H04W 48/18; H04W 84/042; H04W 68/02; H04W 76/10; H04W 76/28; H04W 76/30; H04W 76/34; H04W 8/08; H04W 76/32; H04W 88/14; H04W 24/02; H04W 28/06; H04W 68/00; H04W 88/06; H04W 24/04; H04W 36/12; H04W 84/12; H04W 88/10; H04W 8/12; H04W 92/24; H04W 48/16; H04W 76/25; H04W 60/00; H04W 80/10; H04W 68/12; H04L 1/1864; H04L 1/189; H04L 1/1896
  See application file for complete search history.

(56) References Cited

U.S. PATENT DOCUMENTS

| | | | |
|---|---|---|---|
| 2012/0002545 A1 | 1/2012 | Watfa et al. | |
| 2015/0350988 A1 | 12/2015 | Himayat et al. | |
| 2016/0100380 A1* | 4/2016 | Jha .................... | H04W 68/005 455/458 |
| 2016/0127967 A1 | 5/2016 | Liu et al. | |
| 2017/0013441 A1 | 1/2017 | Manik et al. | |
| 2018/0206207 A1* | 7/2018 | Yu ...................... | H04W 88/06 |
| 2018/0279400 A1* | 9/2018 | Faccin ................ | H04W 68/005 |
| 2020/0015309 A1* | 1/2020 | Li ....................... | H04W 8/02 |
| 2020/0037205 A1* | 1/2020 | Ying ................... | H04W 68/005 |
| 2020/0137672 A1* | 4/2020 | Rommer ............. | H04W 68/005 |

FOREIGN PATENT DOCUMENTS

| | | | | |
|---|---|---|---|---|
| CN | 102210132 A | | 10/2011 | |
| EP | 2680642 A1 | * | 1/2014 | ........ H04W 52/0206 |
| EP | 3 337 282 A1 | | 6/2018 | |
| WO | WO-2013020283 A1 | * | 2/2013 | ............. H04W 8/26 |
| WO | 2016036113 A1 | | 3/2016 | |
| WO | 2016062672 A2 | | 4/2016 | |
| WO | 2017/045099 A1 | | 3/2017 | |

OTHER PUBLICATIONS

Communication pursuant to Article 94(3) EPC dated Jul. 7, 2020 in connection with European Patent Application No. 18 794 898.9, 8 pages.
"3rd Generation Partnership Project; Technical Specification Group Core Network and Terminals; Non-Access-Stratum (NAS) protocol for 5G System (5GS); Stage 3 (Release 15)", 3GPP TS 24.501 V1.0.0 (Mar. 2018), 253 pages.
"3rd Generation Partnership Project; Technical Specification Group Services and System Aspects; System Architecture for the 5G System; Stage 2 (Release 15)", 3GPP TS 23.501 V15.0.0 (Dec. 2017), 181 pages.
Supplementary European Search Report dated Dec. 6, 2019 in connection with European Patent Application No. 18 79 4898, 14 pages.
3GPP TS 23.502 V0.3.0 (Mar. 2017), Technical Specification, 3rd Generation Partnership Project; Technical Specification Group Services and System Aspects; Procedures for the 5G System; Stage 2 (Release 15), Mar. 2017, 113 pages.
ISA/KR, International Search Report and Written Opinion of the International Searching Authority, International Application No. PCT/KR2018/005203, dated Aug. 27, 2018, 10 pages.
The First Office Action dated Mar. 14, 2022, in connection with Chinese Application No. 201880041782.X, 28 pages.
Notice of Non-Final Rejection Jan. 28, 2022, in connection with Korean Application No. 10-2019-7036126, 9 pages.
3GPP TS 23.501 V0.4.0 (Apr. 2017), Technical Specification, 3rd Generation Partnership Project; Technical Specification Group Services and System Aspects; System Architecture for the 5G System; Stage 2 (Release 15), Apr. 2017, 123 pages.
Nokia, et al.,"Pseudo-CR on sublayers in L3: N1, 5GMM, 5GSM," C1-171403, 3GPP TSG-CT WG1 Meeting #103, Spokane (WA), USA, Apr. 3-7, 2017, 6 pages.
Nokia, et al.,"Pseudo-CR on sublayers in L3: N1, 5GMM, 5GSM," C1-171912, 3GPP TSG-CT WG1 Meeting #103, Spokane (WA), USA, Apr. 3-7, 2017, 5 pages.
European Patent Office, "European Search Report," dated May 31, 2022, in connection with European Patent Application No. 22155728. 3, 15 pages.

* cited by examiner

METHODS AND SYSTEMS FOR PERFORMING PAGING OPERATIONS IN A 5G NETWORK

CROSS-REFERENCE TO RELATED APPLICATIONS

This application is a 371 National Stage of International Application No. PCT/KR2018/005203, filed May 4, 2018, which claims priority to Indian Patent Application No. 201741015976, filed May 5, 2017, Indian Patent Application No. 201741021399, filed Jun. 19, 2017, and Indian Patent Application No. 201741015976, filed Apr. 30, 2018, the disclosures of which are herein incorporated by reference in their entirety.

BACKGROUND

1. Field

Embodiments herein relate to 5th Generation (5G) communication networks, and more particularly to methods and systems for performing paging operations in 5G communication networks.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

The principal object of the embodiments herein is to disclose methods and systems for performing paging operations in $5^{th}$ Generation (5G) communication networks.

Another object of the embodiments herein is to save radio resources utilized for paging on 3GPP access, by transmitting paging message(s) through non-3GPP access networks, when UE is reachable through the non-3GPP access networks.

Another object of the embodiments herein is to enable transmission of a notification message by the UE to the 5G core network, indicating inability of the UE to transmit service request message, in response to receiving the paging message from the 5G core network.

Another object of the embodiments herein is to detect the connectivity status of the UE with the 5G core network over the non-3GPP access networks.

The proposed method and system provides an effective mechanism that the transmission of NAS message through the N3IWF can lead to a significant saving of radio resources.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which.

DETAILED DESCRIPTION

Figure 1:
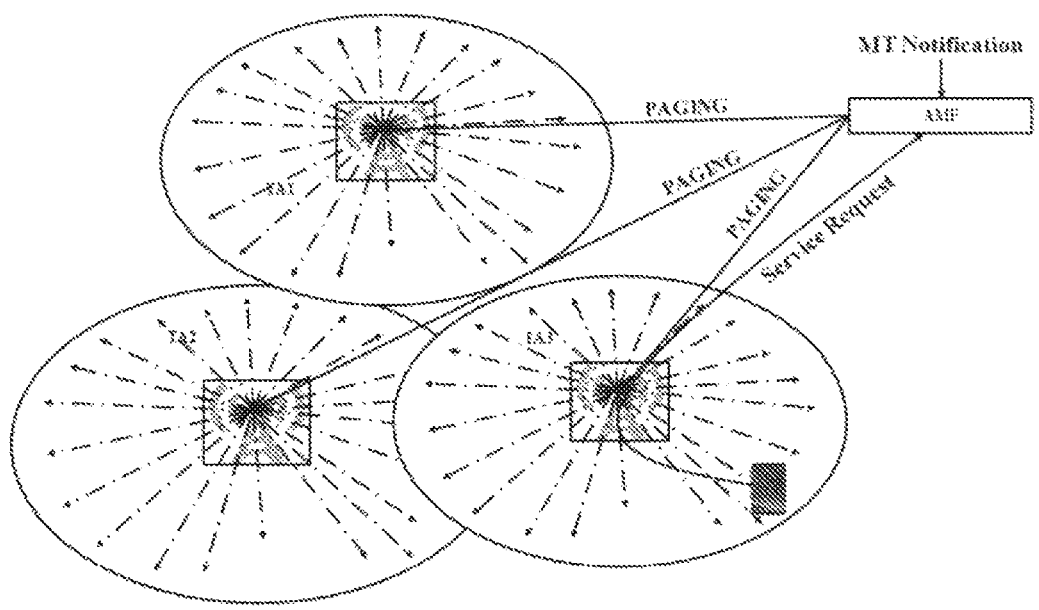
FIG. 1 depicts an example, wherein radio resources are used for performing paging operation through a $5^{th}$ Generation (5G) Radio Access Network (RAN)

Accordingly, the embodiments provide methods and systems for performing paging operation in 5$^{th}$ Generation (5G) communication networks. The 5G core network can transmit a NAS message to a UE through a N3GPP access network, if the UE is reachable through the N3GPP access network. The NAS message can be sent by the 5G core network to the N3IWF. The N3IWF can send the NAS message to the UE, through the N3GPP access network. The UE can send a service request over 3GPP access, in response to the NAS message, to the 5G core network, through a 5G RAN. If the UE is not having access to the 5G RAN, then the UE can transmit a notification response message to the 5G core network, indicating the inability to transmit a service request. The transmission of NAS message through the N3IWF can lead to a significant saving of radio resources.

Accordingly, the embodiments herein provide a method for switching a User Equipment (UE) (300) to 5G Mobility Management (5GMM)-CONNECTED mode over a 3GPP access network, the method comprising: receiving, by a reception unit (302), a NAS message from an Access and Mobility Function (AMF) (402), through a non-3GPP (N3GPP) access network, wherein the NAS message is received from the AMF (402) through a Non-3GPP Inter Working Function (N3IWF) (401); and transmitting, by a transmitter unit (301), a service request message to the AMF (402), through the 3GPP access network, if the UE (300) is in 5GMM-REGISTERED.NORMAL SERVICE sub-state.

In an embodiment, the UE (300) receives the NAS message when there is mobile terminating data and/or signaling for the UE (300) over the 3GPP access network, wherein the UE (300) switches from 5GMM-IDLE mode to 5GMM-CONNECTED mode over the 3GPP access network on transmitting the service request message to the AMF (402), wherein the UE (300) is in 5GMM-CONNECTED mode over the N3GPP access network when the UE (300) receives the NAS message.

In an embodiment, the method further comprises transmitting, by the transmitter unit (301), a notification response message to the AMF (402), through the N3GPP access network, indicating inability of the UE (300) to transmit the service request message to the AMF (402) through the 3GPP access network, if the UE (300) is in NO CELL AVAILABLE state.

In an embodiment, the notification response message includes a predefined time period, wherein the AMF (402) can transmit the NAS message to the UE (300) after expiry of the predefined time period.

In an embodiment, the notification response message includes a cause value indicating the reason for the inability of the UE (300) to transmit the service request message to the AMF (402).

In an embodiment, a method for switching a User Equipment (UE) (300) to 5G Mobility Management (5GMM)-CONNECTED mode over a 3GPP access network, the method further comprising: detecting, by the N3IWF (401), status of connectivity between the UE (300) and the N3IWF (401), over the N3GPP access network; and transmitting, by the N3IWF (401), the connectivity status to the AMF (402).

Accordingly, the embodiments herein provide a User Equipment (UE) (300) for switching to 5G Mobility Management (5GMM)-CONNECTED mode over a 3GPP access network, the UE (300) configured to: receive, by a reception unit (302), a NAS message from an Access and Mobility Function (AMF) (402), through a non-3GPP (N3GPP) access network, wherein the NAS message is received from the AMF (402) through a Non-3GPP Inter Working Function (N3IWF) (401); and transmit, by a transmitter unit (301), a service request message to the AMF (402), through the 3GPP access network, if the UE (300) is in 5GMM-REGISTERED.NORMAL SERVICE sub-state.

In an embodiment, the UE (300) receives the NAS message when there is mobile terminating data and/or signaling for the UE (300) over the 3GPP access network, wherein the UE (300) switches from 5GMM-IDLE mode to 5GMM-CONNECTED mode over the 3GPP access network on transmitting the service request message to the AMF (402), wherein the UE (300) is in 5GMM-CONNECTED mode over the N3GPP access network when the UE (300) receives the NAS message.

In an embodiment, the UE (300) is further configured to transmit, by the transmitter unit (301), a notification response message to the AMF (402), through the N3GPP access network, indicating inability of the UE (300) to transmit the service request message to the AMF (402) through the 3GPP access network, if the UE (300) is in NO CELL AVAILABLE state.

In an embodiment, the notification response message includes a predefined time period, wherein the AMF (402) can transmit the NAS message to the UE (300) after expiry of the predefined time period.

In an embodiment, the notification response message includes a cause value indicating the reason for the inability of the UE (300) to transmit the service request message to the AMF (402).

In an embodiment, the UE (300) is further configured to:

detect, by the N3IWF (401), status of connectivity between the UE (300) and the N3IWF (401), over the N3GPP access network; and transmit, by the N3IWF (401), the connectivity status to the AMF (402).

Accordingly, the embodiments herein provide a computer program product comprising a computer readable storage medium having a computer readable program stored therein, wherein the computer readable program, when executed on a computing device, causes the computing device to: receive a NAS message from an Access and Mobility Function (AMF) (402), through a non-3GPP (N3GPP) access network, wherein the NAS message is received from the AMF (402) through a Non-3GPP Inter Working Function (N3IWF) (401); and transmit a service request message to the AMF (402), through the 3GPP access network, if the UE (300) is in 5GMM-REGISTERED.NORMAL SERVICE sub-state.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Currently, a User Equipment (UE) with $5^{th}$ Generation (5G) support capability can connect with the 5G core network through non-$3^{rd}$ Generation Partnership Project (3GPP) (N3GPP) access networks, such as Wireless Fidelity (WI-FI), Wireless Local Area Network (WLAN), and so on. The N3GPP access networks can be referred to as standalone and are generally untrusted networks. The UE, connecting through the standalone N3GPP access networks, can support Non-Access Stratum (NAS) signaling with the 5G core network through a Non-3GPP Inter Working Function (N3IWF). The UE can establish an IPSec tunnel with the N3IWF for information exchange through the N3GPP access networks. The UE can be authenticated by the 5G core network and network security can be ensured by usage of the IPSec tunnel.

The radio resources, used for exchange of user plane and control plane information between the UE and the 5G core network through the 3GPP access Radio Access Network (RAN), can be expensive. Paging operations are generally performed by the 5G core network on 3GPP access when the UE is in the Core Network (CN)-idle state. Transmission of paging messages to the UE may require considerable amount of radio resources. Optimizations for performing paging operation in 5G communication networks may be available, considering accessibility of the UE to the 5G core network through the N3IWF (N3GPP access networks).

Currently, the N3IWF may not be able to detect loss of connectivity with the UE due to failure of the N3GPP access network. As such, the N3IWF may not be able to inform the 5G core network about the connectivity status of the UE. In such a scenario, the Access and Mobility Function (AMF), in the 5G core network, may not be correctly updated about the connectivity state of the UE through the N3GPP access networks. This can lead to un-expected behaviors such as AMF transmitting downlink notification to the UE through the N3GPP access networks, even though the UE may not be in a position to receive the downlink notification.

FIG. 1 depicts an example, wherein radio resources are used for performing paging operation through a 5G RAN. As depicted in FIG. 1, the UE can be connected to the AMF in the 5G core network, through the 5G RAN [Tracking Area (TA) 1]. Consider that a UE is camped in a cell and is in Connected Mobility (CM)-idle state. If Mobile Terminating (MT) data/signaling for the UE arrives in the 5G core network, the 5G core network can initiate the paging procedure by transmitting a paging message in the entire registered area (registered TA list). This may require a considerable amount of radio resources as paging operation is performed by broadcasting paging message in multiple registered TAs.

Figure 2:
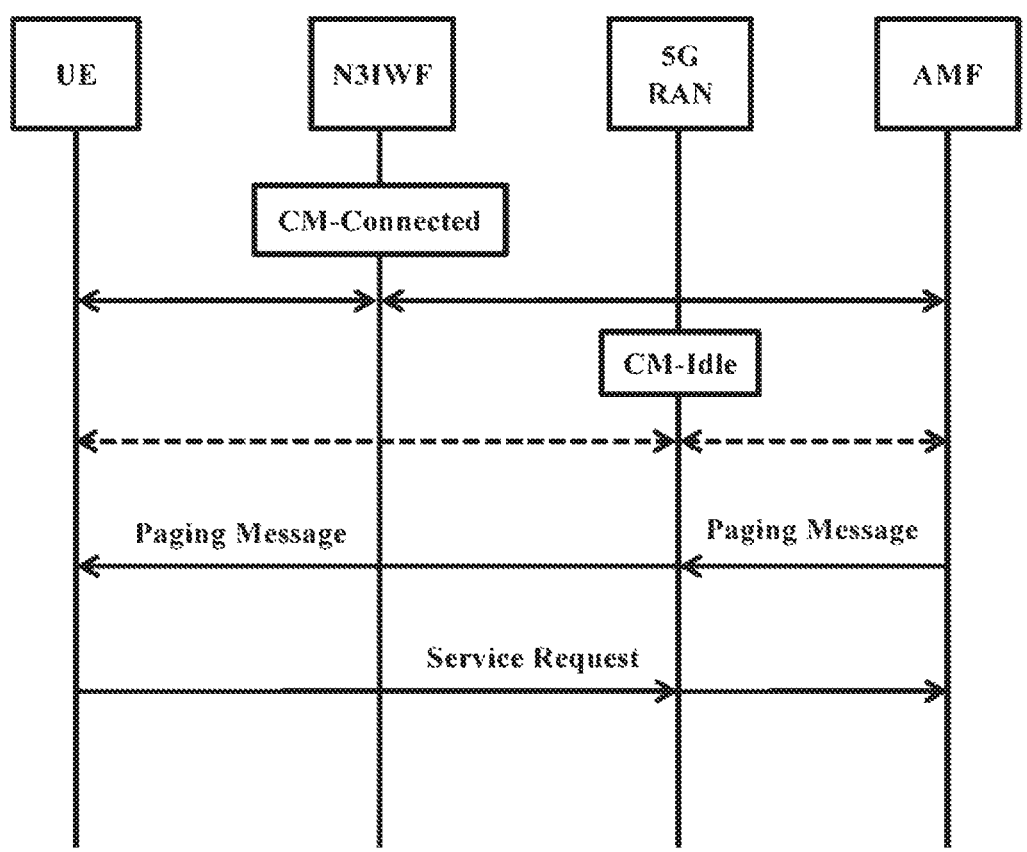
FIG. 2 depicts an example signaling exchange between network entities and a User Equipment (UE) for performing the paging operation.

FIG. 2 depicts an example signaling exchange between network entities and the UE for performing the paging operation. Consider that the UE is connected to the 5G core network through both 5G RAN (3GPP access) and N3IWF (non-3GPP access). As depicted in FIG. 2, the UE is in the CM-connected state over non-3GPP access and is in the CM-idle state over 3GPP access. The UE can transmit and receive information through the N3IWF when the UE is in the CM-connected mode. If the UE is in the CM-idle mode on 3GPP access and MT data (downlink, signaling, notification, and so on) meant for the UE arrives at the 5G core network, the AMF can transmit a paging message to the UE through the 5G RAN. The UE can receive the paging message and transmit a service request to the AMF, through the 5G RAN, to receive the MT data. The 5G core network may utilize significant amount of radio resources while transmitting the paging message through the 5G RAN.

Embodiments herein disclose methods and systems for performing paging operation in 5G communication networks. The embodiments include transmitting a Non-Access Stratum (NAS) message (for: example NOTIFICATION message) to the User Equipment (UE) through non-3$^{rd}$ Generation Partnership Project (N3GPP) access network; if the UE is in 5GMM-CONNECTED mode over N3GPP access network and in 5GMM-IDLE mode over a 3GPP access network. The transmission can take place when down link data and/or signaling data is received by 5G core network for transmission, over the 3GPP access network, to the UE. The NAS message can be sent by the 5G core network, when same Access and Mobility Function (AMF) serves both the 3GPP access network and the N3GPP access network, to the UE through Non 3GPP Inter Working Function (N3IWF). On reception of the NAS message over the N3GPP access network, the UE can initiate a NAS procedure and send an initial direct transfer message (for example: a service request message or a registration request message), through the 3GPP access network such as 5G Radio Access Network (RAN). The transmission of NAS message to UE through the N3GPP access network, instead of broadcasting paging message over the 3GPP access network, can lead to a significant saving of radio resources. If the 5G core network does not receive the service request message or registration request message over the 3GPP access network, then the 5G core network can retry transmitting the NAS message over 3GPP access.

However, if the UE is not able to send or is not willing to send the service request message over the 3GPP access network, either due to the UE being in Out Of Service (OOS) state, i.e. NO-CELL-AVAILABLE state, or if policy does not allow the UE to send the service request message; then the UE can send a NAS message (for example: NOTIFICATION RESPONSE to the 5G core network over N3GPP access network, indicating the inability or non-willingness of the UE to transmit the service request message over 3GPP access network. The AMF, in the 5G core network can understand that even if the NAS message is sent to the UE over the 3GPP access network, the UE will not be able to respond to the paging message. Hence, downlink data transmission can be aborted, and an indication can be provided to the Session Management Function (SMF). The NOTIFICATION RESPONSE message can have a timer value, after expiry of which, the AMF can retry sending the paging message optionally; if there is a pending data or signaling to be delivered to the UE. The NOTIFICATION RESPONSE can also include a cause of rejection, to indicate to the AMF the reason (for example the UE is in NO-CELL-AVAILABLE) for which the UE is not able to move to 5GMM-CONNECTED mode. The NOTIFICATION RESPONSE message can have a list of PDU session ID's which are allowed to be moved to N3GPP access networks, using this information AMF can move the PDU sessions from 3GPP access to N3GPP access.

Referring now to the drawings, and more particularly to FIGS. 3 through 8, where similar reference characters denote corresponding features consistently throughout the figures, there are shown preferred embodiments.

Figure 3:
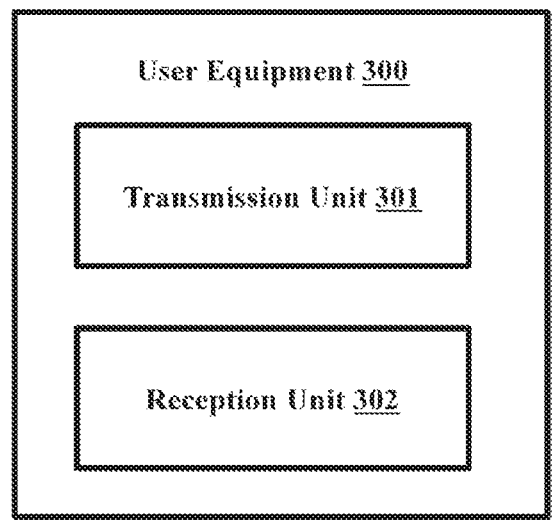
FIG. 3 depicts various units of a UE with 5G operability, according to embodiments as disclosed herein.

FIG. 3 depicts various units of a UE 300 with 5G operability, according to embodiments as disclosed herein.

As, depicted in FIG. 3, the UE 300 can include a transmission unit 301 and a reception unit 302. The UE 300 can have access to a plurality of networks, such as at least one 5G RAN and at least one N3IWF. The UE 300 can be in 5GMM-CONNECTED mode over N3GPP access network. As such, information from the UE 300, through the N3GPP access network, is accepted by the 5G core network through the N3IWF. The reception unit 302 can receive a NAS message from the 5G core network through the N3GPP access network. The 5G core network can transmit the NAS message to the N3IWF. The reception unit 302 can receive the message from the N3IWF through the N3GPP access network.

The transmission unit 301 can transmit a service request message to the 5G core network, through the 5G RAN, for receiving Mobile Terminated (MT) traffic from the 5G core network. The transmission of the NAS message through the N3GPP access network allows considerable saving of radio resources, which could have been wasted by transmitting the paging message to the UE 300 through the 5G RAN.

In case the UE 300 does not have access to the 5G RAN and the reception unit 302 receives a NAS message from the 5G core network through the N3GPP access network, then the transmission unit 301 can transmit a notification response message to the 5G core network, through the N3GPP access network. The notification response message can indicate that the UE 300 may not be able to respond to the NAS message due to inaccessibility of the UE 300 to the 5G RAN. The notification message can also include a predefined time period. The 5G core network can retransmit the paging message to the UE 300 after expiry of the predefined time period. This prevents repeated transmission of paging messages from the 5G core network to the UE 300, while the UE 300 is not having access to the 5G RAN.

FIG. 3 shows exemplary units of the UE 300, but it is to be understood that other embodiments are not limited thereon. In other embodiments, the UE 300 may include less or more number of units. Further, the labels or names of the units are used only for illustrative purpose and does not limit the scope of the invention. One or more units can be combined together to perform same or substantially similar function in the UE 300.

Figure 4:
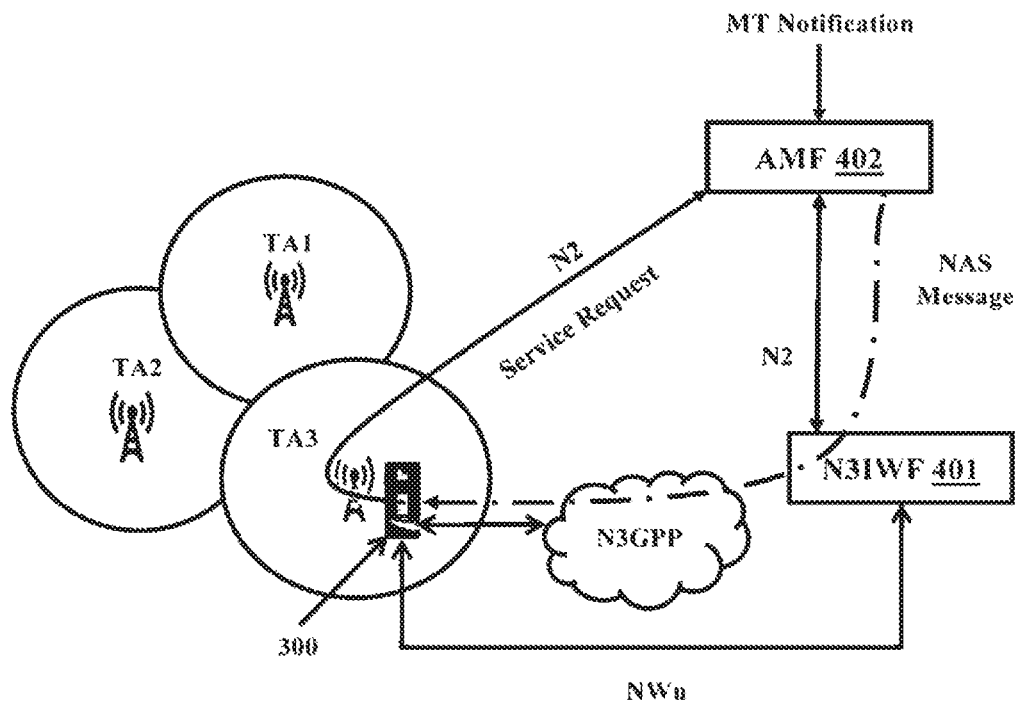
FIG. 4 depicts an example delivery of a paging message to the UE 300 from the 5G core network through a N3GPP access network, according to embodiments as disclosed herein.

FIG. 4 depicts an example delivery of a NAS message to the UE 300 from the 5G core network through a N3GPP access network, according to embodiments as disclosed herein. As depicted in FIG. 4, the UE 300 can be simultaneously connected to a 5G RAN (3GPP access) and a N3GPP access network (non-3GPP access). The UE 300 can be connected to the 5G core network through the N3IWF 401. The information between the UE 300 and the N3IWF 401 can traverse through the N3GPP access network. The N3GPP access network may be a trusted network or an untrusted network. Examples of the N3GPP access network can be, but not limited to, a Wireless Fidelity (WI-FI) network, a Wireless Local Area Network (WLAN), a Virtual Private Network (VPN), an ad-hoc network, and so on. The UE 300 can be connected to the N3IWF 401 through the NWu interface. The information exchange between the UE 300 and the N3IWF 401, which can be through the N3GPP access network. The N3IWF can be connected to the Access and Mobility Function (AMF) 402 in the 5G core network using the N2 interface.

If the UE 300 is in the Connected Mobility (CM)-idle state over 5G RAN and in the CM-connected state over the N3GPP access network, the AMF 402, in the 5G core network, can transmit the NAS message to the UE 300 over the N3GPP access network. When Mobile Terminating (MT)

data, for the 3GPP access of the UE 300, arrives in the 5G core network, the 5G core network can initiate the paging procedure by transmitting a NAS message through the AMF 402, in order to determine the location of the UE 300 at the Tracking Area (TA) level and provide downlink services.

On receiving the NAS message through the N3GPP access network, the UE 300 can switch to CM-connected state over the 5G RAN and respond to the paging message by transmitting a service request message or registration request message to the AMF 402. The service request message can be sent through the 5G RAN.

Figure 5:
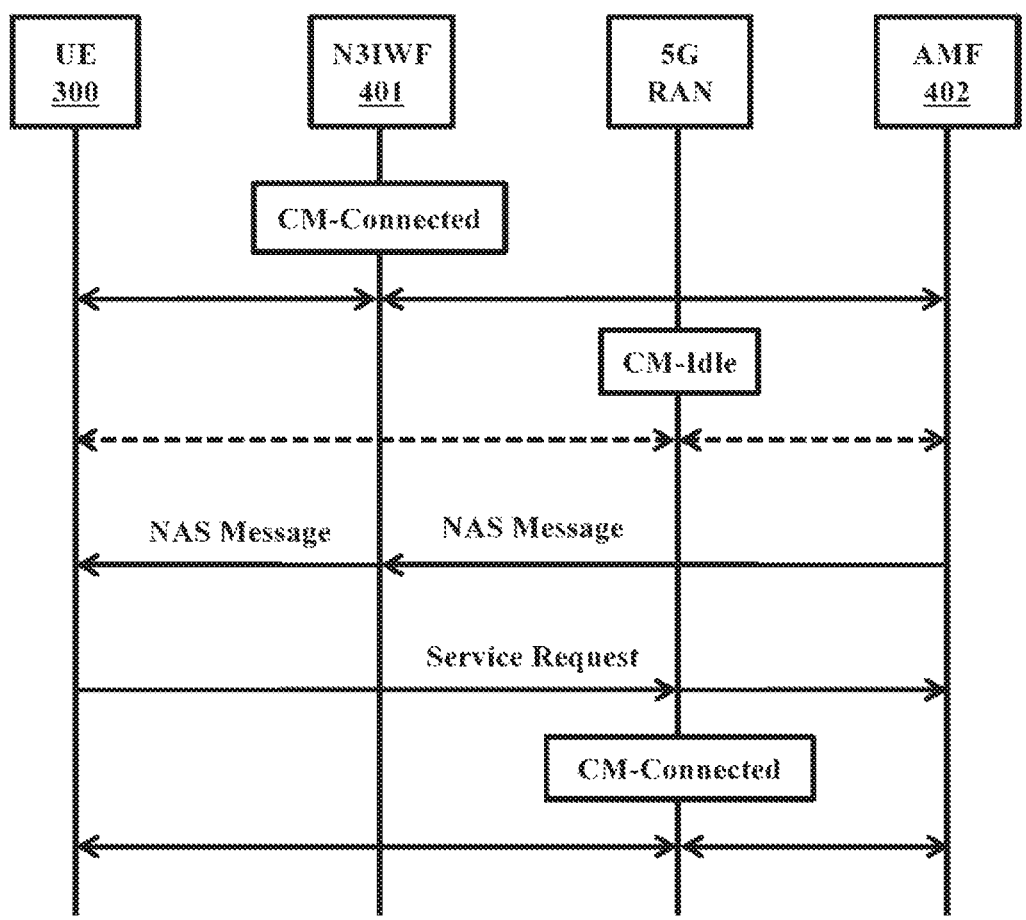
FIG. 5 depicts signaling exchange between network entities and the UE for performing the paging operation, according to embodiments as disclosed herein.

FIG. 5 depicts signaling exchange between network entities and the UE 300 for performing the paging operation, according to embodiments as disclosed herein. Consider that the UE 300 is connected to the 5G core network through both the 5G RAN (3GPP access) and the N3IWF 401 (non-3GPP access). The UE 300 can be in the CM-connected state over the N3IWF 401 and in the CM-idle state over the 5G RAN. The UE 300 can immediately transmit and receive information from the 5G core network (AMF 402) through the N3IWF 401, as the UE 300 is in the CM-connected mode.

As the UE 300 is in the CM-idle state over the 5G RAN, the AMF 402 sends the paging message to the UE 300 through the 5G RAN, in order to deliver downlink MT data to the UE 300. On receiving the paging message, the UE 300 can switch to the CM-connected state in order to receive MT data from the 5G core network. However, sending the paging message through the 5G RAN requires considerable amount of radio resources.

As the UE 300 is in CM-connected state over the N3IWF 401, the AMF 402 can transmit the NAS message to the UE 300 through the N3IWF 401. The AMF 402 can transmit the NAS message when MT data (downlink, signaling, notification, and so on), meant for the UE 300, arrives at the 5G core network. The paging message can be transmitted in a Non-Access Stratum (NAS) container (example notification message). The paging message can additionally have an indication that UE is expected to trigger NAS procedure over 3GPP access.

The UE 300 can receive the NAS message through the N3IWF and switch to the CM-connected state over the 5G RAN. The UE 300 can, thereafter, transmit a service request message, in response to the paging message to the AMF 402 through the 5G RAN. In the CM-connected state over the 5G RAN, the UE 300 can receive the MT data from the 5G core network through the 5G RAN.

Figure 6:
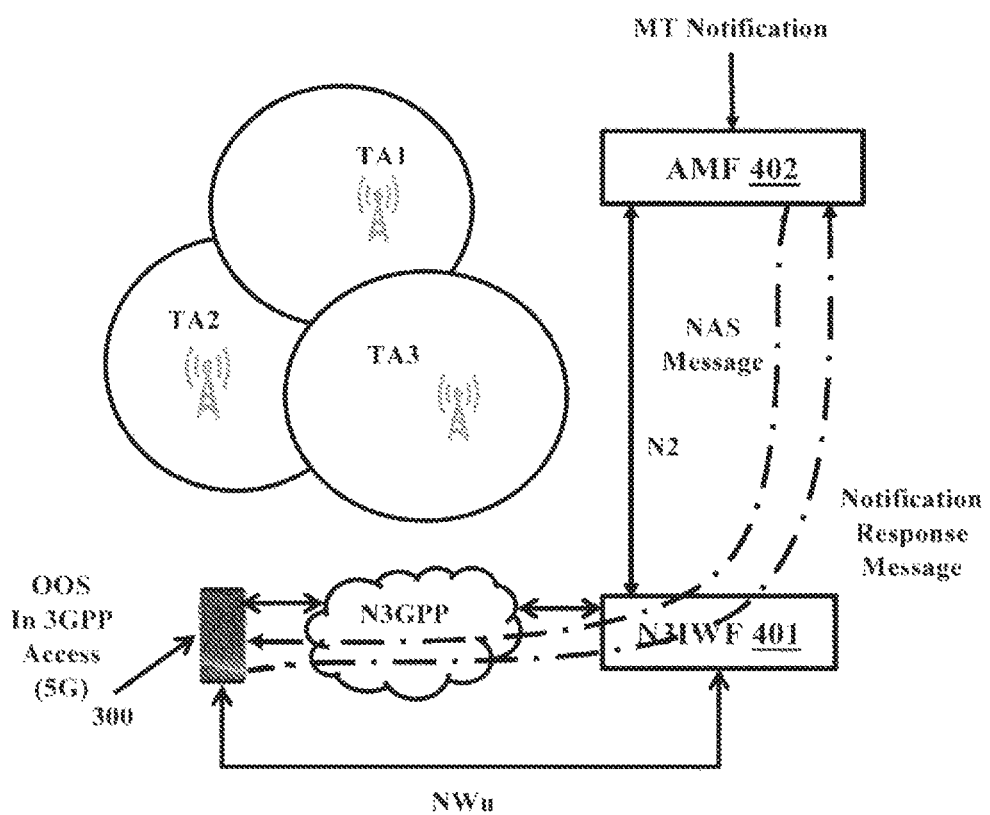
FIG. 6 depicts an example scenario, wherein the UE transmits a notification response message to the 5G core network through the N3GPP access network, on receiving a paging message from the 5G core network, through the N3GPP access network if UE is unable to initiate service request over 3GPP access, according to embodiments as disclosed herein.

FIG. 6 depicts an example scenario, wherein the UE 300 transmits a notification message to the 5G core network through the N3GPP access network, on receiving a NAS message from the 5G core network, through the N3GPP access network, if the UE 300 is unable to initiate service request over 3GPP access network. Consider that the UE 300 is out of coverage area of the 5G RAN (OOS in 3GPP access network or unavailability of Radio Frequency (RF) for 5G) but is connected to the 5G core network through the N3GPP access network. On receiving the NAS message from the N3IWF 401, through the N3GPP access network, the UE 300 can transmit the notification response message to the 5G core network, through the N3GPP access network. The notification response message can indicate that the UE 300 may currently not have access to the 5G RAN, and hence, cannot respond to the NAS message. The notification response message can also include a predefined time period. The 5G core network can retransmit the NAS message to the UE 300 after expiry of the predefined time period. This can prevent repeated transmissions of the paging message by the 5G core network.

If there is a loss of connectivity between the UE 300 and the N3IWF 401 due to a failure of the N3GPP access networks and the 5G core network is having accessibility of the UE 300 through the 5G RAN, then the 5G core network can re-transmit the paging message to the UE 300 through the 5G RAN. The UE 300 can transmit the service request through the 5G RAN, in order to receive MT data.

Figure 7:
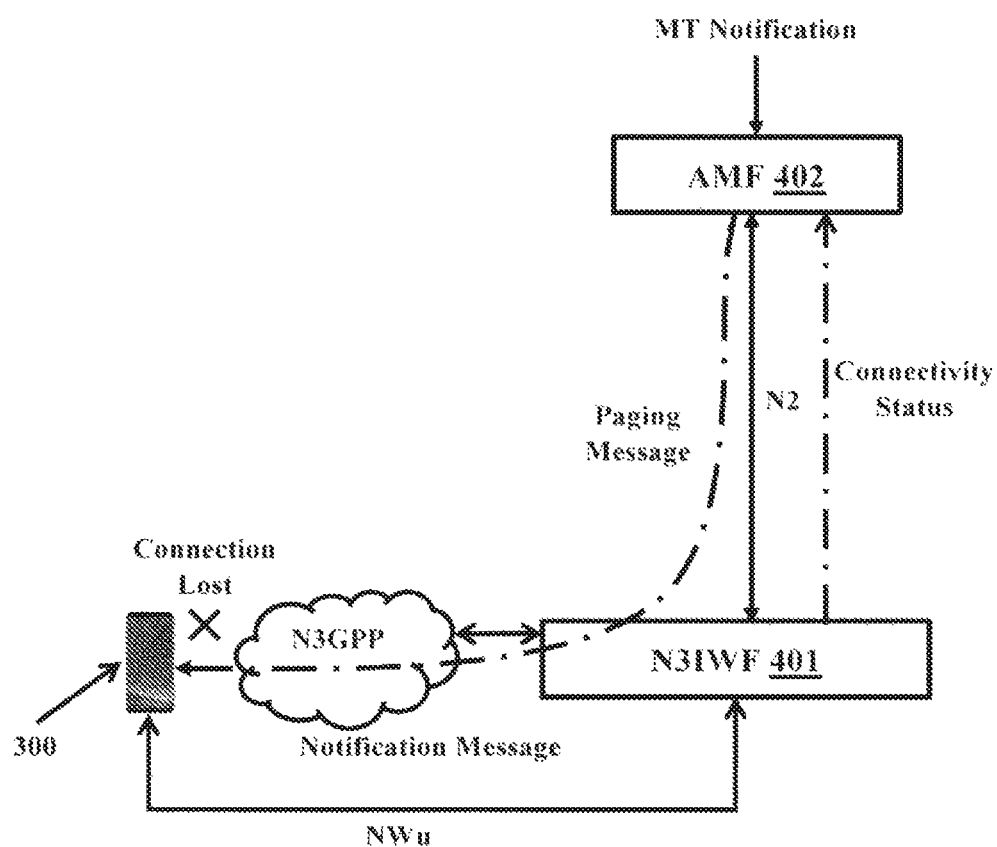
FIG. 7 depicts detection of connectivity status of the UE by a Non-3GPP Inter Working Function (N3IWF) in the 5G core network, according to embodiments as disclosed herein.

FIG. 7 depicts detection of connectivity status of the UE 300 by the N3IWF 401 in the 5G core network. Consider that the UE 300 is registered through 3GPP and non-3GPP simultaneously. The UE is in CM-IDLE state over the 5G RAN and in CM-Connected state over the N3IWF 401. The AMF 402 may page/notify the UE 300 if downlink data/signaling for the UE 300 arrive at the AMF 402. As the UE 300 is in CM-IDLE state over the 5G RAN, there can be a considerable wastage of network resources due to paging by the AMF 402. The paging operation is performed by the AMF 402, as the AMF 402 is not aware that the UE 300 is in CM-IDLE state.

If connection between the UE 300 and the 5G core network, through the N3GPP access network, is lost, then a 'dead peer' can be detected by the N3IWF 401. The N3IWF 401 can report the loss of connectivity, with the UE 300, to the AMF 402. The AMF 402 can, thereafter, utilize the 5G RAN for broadcasting or transmitting network related optimizations, such as transmissions of paging messages, to the UE 300. The 5G core network considers the UE 300 to be in CM-idle state over non-3GPP access.

Figure 8:
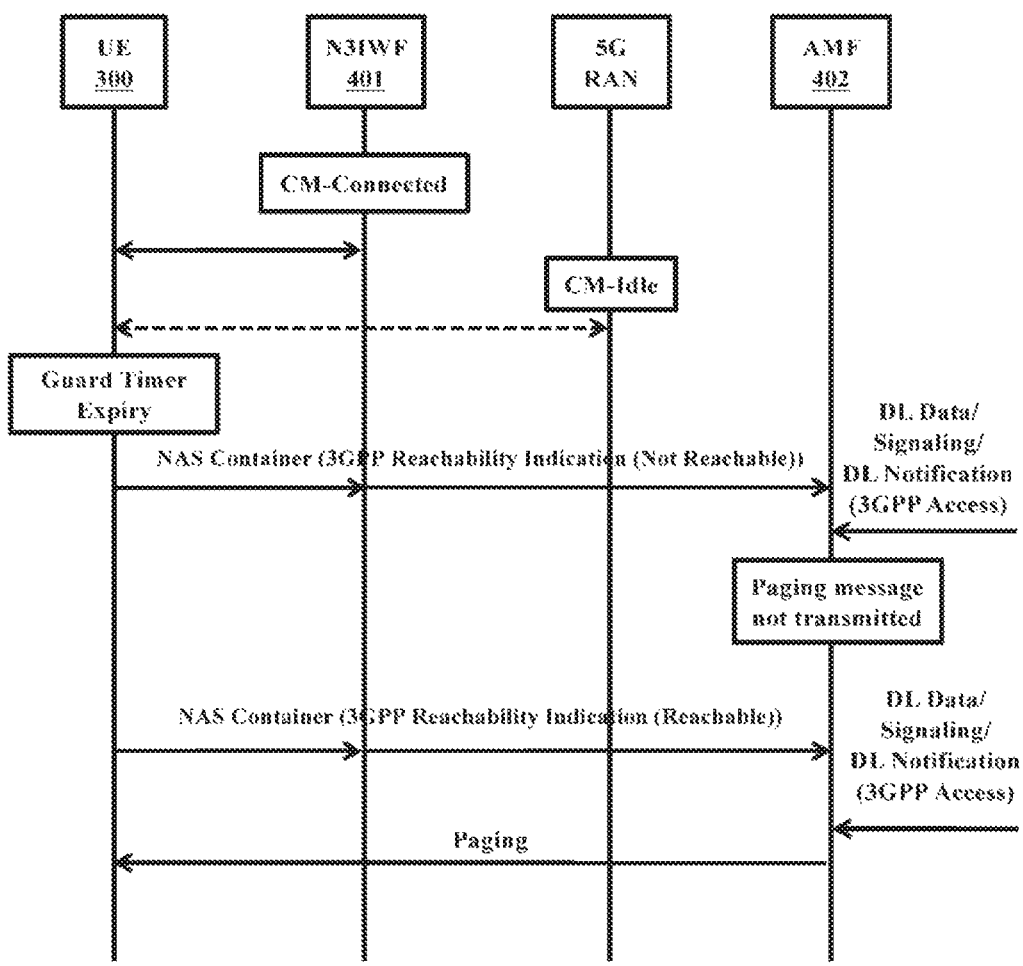
FIG. 8 depicts signaling sequence, wherein the UE is informing its reachability status to the 5G core network, according to embodiments as disclosed herein.

FIG. 8 depicts signaling sequence, wherein the UE 300 is informing its reachability status to the 5G core network. The UE 300 can be registered to 5G core network through both the 5G RAN and the N3IWF 401. As depicted in FIG. 8, the UE 300 is in CM-Connected state over the non-3GPP access 401 and CM-Idle state over the 3GPP access. The UE 300 can also inform when it is switching from 'No Service' state to 'In Service' state, and vice versa, over the 3GPP access network (5G RAN), through the N3IWF 401 to the 5G core network using the NAS container message.

The UE 300 can decide whether to indicate 'NO Service' status to the AMF 402 when 'NO Service' state is detected for 3GPP access network (over the 5G RAN). The UE 300 can start a timer (guard timer) as soon as 'NO service' is detected. The UE 300 can notify the AMF 402 when the guard timer expires. The guard timer can be stopped if the UE 300 comes back to 'In Service' state. Once 'No Service' is indicated to the AMF 402, the UE 300 can indicate 'In Service Status' to the AMF 402 as soon as the UE 300 is in service over the 5G RAN.

Consider that the UE 300 is in 'No Service' state over the 5G RAN and the 'No Service' state of the UE 300 is indicated to the AMF 402. When the UE 300 switches to 'In Service' state over the 5G RAN and if the UE 300 is not able to inform the 'In service' state to the AMF 402 through the N3IWF 401, then the UE 300 can transmit a service request message or registration message to the AMF 402 to indicate its 'In service' state to the AMF 402.

Figure 9:
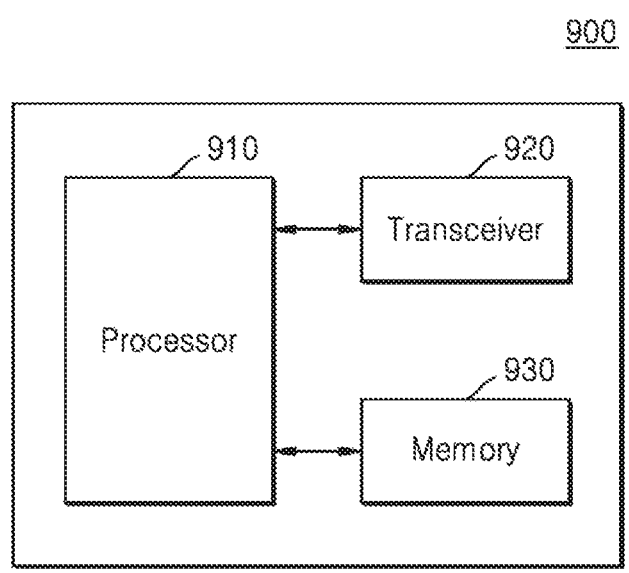
FIG. 9 depicts a schematic structure diagram of a UE according to another exemplary embodiment of the present disclosure.

FIG. 9 is a schematic structure diagram of a UE according to another exemplary embodiment of the present disclosure.

Referring to the FIG. 9, the device 900 may include a processor 910, a transceiver 920 and a memory 930. However, all of the illustrated components are not essential. The device 900 may be implemented by more or less components than those illustrated in FIG. 9. In addition, the processor 910 and the transceiver 920 and the memory 930 may be implemented as a single chip according to another embodiment.

The aforementioned components will now be described in detail.

The processor 910 may include one or more processors or other processing devices that control the proposed function, process, and/or method. Operation of the device 900 may be implemented by the processor 910.

The processor 910 may receive a NAS message from an Access and Mobility Function (AMF) (402), through a non-3GPP (N3GPP) access network, wherein the NAS message is received from the AMF (402) through a Non-3GPP Inter Working Function (N3IWF) (401).

The processor 910 may transmit a service request message to the AMF (402), through the 3GPP access network, if the UE (300) is in 5GMM-REGISTERED.NORMAL SERVICE sub-state.

The transceiver 920 may include a RF transmitter for up-converting and amplifying a transmitted signal, and a RF receiver for down-converting a frequency of a received signal. However, according to another embodiment, the transceiver 920 may be implemented by more or less components than those illustrated in components.

The transceiver 920 may be connected to the processor 910 and transmit and/or receive a signal. The signal may include control information and data. In addition, the transceiver 920 may receive the signal through a wireless channel and output the signal to the processor 910. The transceiver 920 may transmit a signal output from the processor 910 through the wireless channel.

The memory 930 may store the control information or the data included in a signal obtained by the device 900. The memory 930 may be connected to the processor 910 and store at least one instruction or a protocol or a parameter for the proposed function, process, and/or method. The memory 930 may include read-only memory (ROM) and/or random access memory (RAM) and/or hard disk and/or CD-ROM and/or DVD and/or other storage devices.

The programs running on the device according to the present disclosure may be programs that enable the computer to implement functions of the embodiments of the present disclosure by controlling a central processing unit (CPU). The programs or information processed by the programs may be temporarily stored in a volatile memory, such as a random access memory (RAM), a hard disk drive (HDD), a non-volatile memory (e.g., flash memory), or other memory system.

The programs for realizing the functions of the embodiments of the present disclosure may be recorded on a computer-readable recording medium. Corresponding functions can be realized by making the computer system read the programs recorded on the recording medium and execute these programs. The so-called "computer system" herein may be a computer system embedded in the device, and may include an operating system or hardware, such as a peripheral device. The "computer-readable recording medium" may be a semi-conductor recording medium, an optical recording medium, a magnetic recording medium, a recording medium for a short-time dynamic storage program, or any other computer readable recording medium.

Various features or functional blocks of the device used in the above embodiments may be implemented or executed by circuitry (e.g., monolithic or multi-chip integrated circuits). The circuitry designed to perform the functions described in this specification may include general purpose processors, digital signal processors (DSPs), application specific integrated circuits (ASICs), field programmable gate arrays (FPGAs), or other programmable logic devices, discrete gate or transistor logic, discrete hardware components, or any combination of the above devices. The general purpose processor may be a microprocessor or any existing processor, controller, microcontroller, or state machine. The circuit may be a digital circuit or an analog circuit. One or more embodiments of the present disclosure may also be implemented using these new integrated circuit techniques in the event of a new integrated circuit technology that replaces existing integrated circuits due to advances in semiconductor technology.

The embodiments disclosed herein can be implemented through at least one software program running on at least one hardware device and performing network management functions to control the network elements. The network elements shown in FIG. 4 include blocks which can be at least one of a hardware device, or a combination of hardware device and software module.

The embodiments disclosed herein describe methods and systems for performing paging operation in 5G communication networks. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

In an embodiment, a computer program product can comprise a computer readable storage medium having a computer readable program stored therein.

In an embodiment, the computer readable program, when executed on a computing device, causes the computing device to: receive a NAS message from an Access and Mobility Function (AMF) (402), through a non-3GPP (N3GPP) access network, wherein the NAS message is received from the AMF (402) through a Non-3GPP Inter Working Function (N3IWF) (401); and transmit a service request message to the AMF (402), through the 3GPP access network, if the UE (300) is in 5GMM-REGISTERED.NORMAL SERVICE sub-state.

Accordingly, the above-described embodiments of the present disclosure can be implemented in a general-purpose digital computer that operates the program using a computer-readable recording medium and a computer-executable program.

The computer-readable recording medium can include a storage medium such as a magnetic storage medium (e.g., ROM, floppy disk, hard disk, etc.), optical reading medium (e.g., CD-ROM, DVD, etc.)

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a User Equipment (UE), in a wireless communication system, the method comprising:
    receiving, a notification message from an Access and Mobility Function (AMF), through a Non-3rd Generation Partnership Project (N3GPP) access network, if the UE is in a CONNECTED mode over the N3GPP access network and in an IDLE mode over a 3GPP access network;
    when the UE is unable to transmit a service request to the AMF through the 3GPP access network, transmitting a notification response message indicating an inability of the UE to transmit a service request message to the AMF through the 3GPP access network, to the AMF through the N3GPP access network, and
    when the UE is able to transmit a service request to the AMF, transmitting a service request message to the AMF through the 3GPP access network in response to the notification message,
    wherein information regarding the inability of the UE to transmit the service request message to the AMF through the 3GPP access network is provided to SMF through the AMF.

2. The method of claim 1, wherein the UE receives the notification message when there is mobile terminating data and/or signaling for the UE.

3. The method of claim 2, wherein the N3GPP access network and the 3GPP access network are served by a same AMF.

4. The method of claim 1, wherein the N3GPP access network is connected to a 5G core network via a Non-3GPP Inter Working Function (N3IWF) and a connection between the UE and N3GPP access network is detected by the N3IWF.

5. A method, performed by an Access and Mobility Function (AMF), in a wireless communication system, the method comprising:
    transmitting, a notification message to a User Equipment (UE), through a non-3rd Generation Partnership Project (N3GPP) access network, if the UE is in a CONNECTED mode over the N3GPP access network and in an IDLE mode over a 3GPP access network;
    determining whether to receive, from the UE, a service request message through the 3GPP access network or a notification response message indicating inability of the UE to transmit a service request message to the AMF through the 3GPP access network, through the N3GPP access network; and
    when receiving the notification response message, transmitting, to a Session Management Function (SMF), information regarding the inability of the UE to transmit the service request message to the AMF through the 3GPP access network.

6. The method of claim 5, wherein the N3GPP access network and the 3GPP access network are served by a same AMF.

7. The method of claim 5, further comprising:
    retransmitting, to the UE, the notification message when the service request message or a notification response message are not received during a predefined time period.

8. The method of claim 5, further comprising:
    transmitting, to the SMF, information regarding failure to re-establish user-plane resources of protocol data unit (PDU) sessions when the notification response message is received from the UE.

9. A user equipment (UE) in a wireless communication system, the UE comprising:
    a transceiver; and
    at least one controller coupled with the transceiver and configured to:
    receive a notification message, from an Access and Mobility Function (AMF), through a non-3GPP, N3GPP, access network, if the UE is in a CONNECTED mode over the N3GPP access network and in an IDLE mode over a 3GPP access network,
    transmit a notification response message indicating an inability of the UE to transmit a service request message to the AMF through the 3GPP access network, to the AMF through the N3GPP access network when the UE is unable to transmit a service request to the AMF through the 3GPP access network, and
    transmit a service request message, to the AMF, through the 3GPP access network in response to the notification message, when the UE is able to transmit a service request to the AMF,
    wherein information regarding the inability of the UE to transmit the service request message to the AMF through the 3GPP access network is provided to a Session Management Function (SMF) through the AMF.

10. The UE of claim 9, wherein the at least one controller is further configured to:
    receive the notification message when there is mobile terminating data and/or signaling for the UE.

11. The UE of claim 10, wherein the N3GPP access network and the 3GPP access network are served by a same AMF.

12. An Access Management Function (AMF) in a wireless communication system, the AMF comprising:
    a transceiver; and
    at least one controller coupled with the transceiver and configured to:
    transmit, a notification message to a User Equipment (UE), through a non-3GPP, N3GPP, access network, if the UE is in a CONNECTED mode over the N3GPP access network and in an IDLE mode over a 3GPP access network,
    determine whether to receive, from the UE, a service request message through the 3GPP access network or a notification response message indicating an inability of the UE to transmit a service request message to the AMF through the 3GPP access network, through the N3GPP access network, and
    when receiving the notification response message, transmit, to a Session Management Function (SMF), information regarding the inability of the UE to transmit the service request message to the AMF through the 3GPP access network.

13. The AMF of claim 12, wherein the at least one controller is further configured to:
    retransmit, to the UE, the notification message when the service request message or the notification response message are not received during a predefined time period.

14. The AMF of claim 12, wherein the at least one controller is further configured to:
    transmit, to the SMF, information regarding failure to re-establish user-plane resources of protocol data unit (PDU) sessions when the notification response message is received from the UE.

* * * * *